(12) United States Patent
Ishitoya (10) Patent No.: US 11,121,388 B2
(45) Date of Patent: Sep. 14, 2021

(54) MOVING BODY HAVING FUEL CELL

(71) Applicant: TOYOTA JIDOSHA KABUSHIKI KAISHA, Toyota (JP)

(72) Inventor: Tsukuo Ishitoya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 113 days.

(21) Appl. No.: 16/208,677

(22) Filed: Dec. 4, 2018

(65) Prior Publication Data
US 2019/0190049 A1 Jun. 20, 2019

(30) Foreign Application Priority Data

Dec. 19, 2017 (JP) ............................. JP2017-242993

(51) Int. Cl.
| | |
|---|---|
| *H01M 8/0662* | (2016.01) |
| *H01M 8/04007* | (2016.01) |
| *H01M 8/04119* | (2016.01) |
| *B60L 58/30* | (2019.01) |

(52) U.S. Cl.
CPC ........... *H01M 8/0662* (2013.01); *B60L 58/30* (2019.02); *H01M 8/04007* (2013.01); *H01M 8/04156* (2013.01)

(58) Field of Classification Search
CPC ............... B60L 58/30; H01M 2250/20; H01M 8/04007; H01M 8/04156; H01M 8/043; H01M 8/0432; H01M 8/04761; H01M 8/0662

See application file for complete search history.

(56) References Cited

U.S. PATENT DOCUMENTS

| | | | | |
|---|---|---|---|---|
| 6,290,594 | B1* | 9/2001 | Osborne | ................... B60L 3/00 454/75 |
| 2003/0203255 | A1* | 10/2003 | Clingerman | ...... H01M 8/04007 429/435 |
| 2007/0000702 | A1* | 1/2007 | Yoshida | ............ H01M 8/04156 429/442 |
| 2010/0190069 | A1* | 7/2010 | Tanaka | ............. H01M 8/04007 429/428 |

FOREIGN PATENT DOCUMENTS

| | | |
|---|---|---|
| JP | 2005073464 A | 3/2005 |
| JP | 2005153853 A | 6/2005 |

(Continued)

*Primary Examiner* — Adam A Arciero
(74) *Attorney, Agent, or Firm* — Dickinson Wright, PLLC (57) ABSTRACT

A moving body having a fuel cell includes: an off-gas passage; a vehicle body having a cabin; an opening and closing body including at least one of a door and a window; an opening and closing situation recognition portion configured to recognize an opening and closing situation of the opening and closing body; a stopped state detection portion configured to detect that the moving body moves at a predetermined speed or lower; and a controller configured to, in a case where the moving body moves at the predetermined speed or lower and there is a demand for electric power generation by the fuel cell, when the opening and closing situation recognition portion recognizes a situation in which the opening and closing body is in an open state, execute an intrusion suppression process to make it difficult for a mist discharged from the off-gas passage to enter the cabin.

3 Claims, 5 Drawing Sheets

(56) References Cited

FOREIGN PATENT DOCUMENTS

| | | | |
|---|---|---|---|
| JP | 2008130392 | A | 6/2008 |
| JP | 2008267837 | A | 11/2008 |
| JP | 2009037869 | A | 2/2009 |
| JP | 2009037870 | A | 2/2009 |
| JP | 2012205330 | A | 10/2012 |
| WO | 2005018980 | A2 | 3/2005 |
| WO | 2009016492 | A2 | 2/2009 |

* cited by examiner

FIG. 1

PLAN VIEW

FIG. 2

SIDE VIEW

DETERMINATION IN S50

| | EVENT OF DETERMINATION | | DETECTION METHOD OF EVENT | CONDITION FOR TRANSITION OF STEP S60 |
|---|---|---|---|---|
| A | OPENING AND CLOSING STATE OF DOOR | | · DOOR OPENING AND CLOSING SENSOR | WHEN DOOR IS OPEN |
| B | DOOR TRANSITIONS FROM CLOSED TO OPENED | B1 | · DOOR OPENING AND CLOSING SENSOR<br>· DOOR KNOB SENSOR | TOUCH ON DOOR KNOB IN STATE IN WHICH DOOR IS CLOSED |
| | | B2 | · DOOR LOCKING MECHANISM<br>· DOOR LOCK SENSOR | THERE IS UNLOCKING OPERATION IN STATE IN WHICH DOOR LOCKING MECHANISM IS LOCKED |
| | | B3 | · DOOR OPENING AND CLOSING SENSOR<br>· HUMAN DETECTION SENSOR (CAMERA) | DETECT APPROACHING HUMAN IN STATE IN WHICH DOOR IS CLOSED |
| C | OPENING AND CLOSING STATE OF WINDOW | | · WINDOW OPENING AND CLOSING SENSOR | WHEN WINDOW IS OPEN |
| D | WINDOW TRANSITIONS FROM CLOSED TO OPENED | | · WINDOW OPENING AND CLOSING SENSOR<br>· WINDOW OPENING AND CLOSING OPERATION PORTION CONTACT SENSOR | THERE IS CONTACT ON WINDOW OPENING AND CLOSING OPERATION PORTION IN STATE IN WHICH WINDOW IS CLOSED |
| E | OPERATION BY OCCUPANT | | · MIST INTRUSION SUPPRESSION SWITCH | WHEN MIST INTRUSION SUPPRESSION SWITCH IS TURNED ON |

FIG. 7

INTRUSION SUPPRESSION PROCESS FOR MIST IN S60

| | | PROCESSING CONTENT | SPECIFIC PROCESS |
|---|---|---|---|
| a | a1 | INCREASE FLOW RATE OF AIR IN OFF-GAS PASSAGE | · INCREASE DRIVING AMOUNT OF AIR COMPRESSOR |
| | a2 | | · INCREASE DRIVING AMOUNT OF AIR COMPRESSOR<br>· OPEN BYPASS VALVE |
| b | b1 | DECREASE FLOW RATE OF AIR SUPPLIED TO FUEL CELL | · DECREASE DRIVING AMOUNT OF AIR COMPRESSOR |
| | b2 | | · DECREASE OPENING DEGREE OF FUEL CELL INLET VALVE (OR CLOSE FUEL CELL INLET VALVE) |
| c | c1 | ENHANCE COOLING OF FUEL CELL | · INCREASE ROTATION SPEED OF RADIATOR FAN |
| | c2 | | · INCREASE AMOUNT OF COOLANT SUPPLIED TO RADIATOR |
| | c3 | | · INCREASE DRIVING AMOUNT OF COOLANT PUMP |
| | c4 | | · DECREASE AIR CONDITIONING LOAD IN CABIN |

MOVING BODY HAVING FUEL CELL

INCORPORATION BY REFERENCE

The disclosure of Japanese Patent Application No. 2017-242993 filed on Dec. 19, 2017 including the specification, drawings and abstract is incorporated herein by reference in its entirety.

BACKGROUND

1. Technical Field

The disclosure relates to a moving body on which a fuel cell system is mounted.

2. Description of Related Art

Japanese Unexamined Patent Application Publication No. 2012-205330 (JP 2012-205330 A) describes a fuel cell vehicle that discharges off-gas from under the floor of the vehicle. In the fuel cell vehicle described in JP 2012-205330 A, while the vehicle is stopped, there is no high power consumption. Therefore, an intermittent operation is performed to stop a fuel cell. In this case, as needed, the electric power of a secondary battery is used.

SUMMARY

However, in a case where the amount of electric power charging the secondary battery is small, the fuel cell is operated to generate electric power. When the fuel cell generates electric power, water is produced, and the water is discharged from under the floor of the vehicle as water vapor. When the temperature of the atmosphere is low, a portion or all of the discharged water vapor may be cooled by the atmosphere, condense, and form a mist. When a door is opened at a timing when a portion or all of the discharged water vapor forms a mist, the water vapor or the mist infiltrates into the vehicle depending on the direction of the wind, and there is a possibility that an occupant may feel uncomfortable.

An aspect of the disclosure relates to a moving body having a fuel cell. The moving body includes: an off-gas passage provided under a floor of the moving body and configured to discharge an off-gas that is discharged from the fuel cell and contains water vapor; a vehicle body having a cabin in which an occupant rides; an opening and closing body including at least one of a door and a window provided in the vehicle body; an opening and closing situation recognition portion configured to recognize an opening and closing situation of the opening and closing body; a stopped state detection portion configured to detect that the moving body moves at a predetermined speed or lower; and a controller configured to, in a case where the moving body moves at the predetermined speed or lower and there is a demand for electric power generation by the fuel cell, when the opening and closing situation recognition portion recognizes a situation in which the opening and closing body is in an open state, execute an intrusion suppression process to make it difficult for a mist discharged from the off-gas passage to enter the cabin. According to the aspect of the disclosure, since the controller executes the intrusion suppression process when the situation in which the opening and closing body is in the open state is recognized, intrusion of mist generated from the off-gas into the cabin is suppressed, so that an uncomfortable feeling of the occupant can be further suppressed.

The moving body according to the aspect may further include an outside air temperature sensor configured to acquire an outside air temperature. The controller may not execute the intrusion suppression process in a case where the outside air temperature is equal to or higher than a predetermined temperature. According to the aspect of the disclosure, in a case where the outside air temperature is equal to or higher than the predetermined temperature, it becomes difficult for the water vapor in the off-gas to become a mist. Therefore, even when the intrusion suppression process is not executed, intrusion of the mist into the cabin can be further suppressed.

In the moving body according to the aspect of the disclosure, the opening and closing situation recognition portion may include at least one of (A) a first sensor configured to detect at least one of opening and closing of the opening and closing body, (B) a second sensor configured to detect an operation of a switch for opening the opening and closing body, (C) a third sensor configured to detect an operation of a switch for unlocking the opening and closing body, and (D) a fourth sensor configured to recognize that a possibility that the opening and closing body is opened is equal to or higher than a predetermined value based on location of a human outside the moving body. According to the aspect of the disclosure, the opening and closing situation recognition portion can recognize the opening and closing situation of the opening and closing body using the sensors mentioned above.

In the moving body according to the aspect of the disclosure, the off-gas passage may be a cathode off-gas passage which discharges a cathode gas. The controller may execute, as the intrusion suppression process, at least one process among (a) a process of increasing a flow rate of air flowing into the cathode off-gas passage as compared to that before execution of the intrusion suppression process, (b) a process of decreasing the flow rate of the air supplied to the fuel cell to be lower than the flow rate of the air corresponding to a demanded amount of electric power generated, and (c) a process of enhancing cooling of the fuel cell as compared to that before the execution of the intrusion suppression process. According to the aspect of the disclosure, since the controller executes at least one process among the processes described above as the intrusion suppression process, intrusion of the mist into the cabin can be further suppressed.

The disclosure can be realized in various aspects, and can also be realized in various forms such as a moving body on which a fuel cell system is mounted, and a method of suppressing a mist generated from a fuel cell system or a fuel cell vehicle, in addition to a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
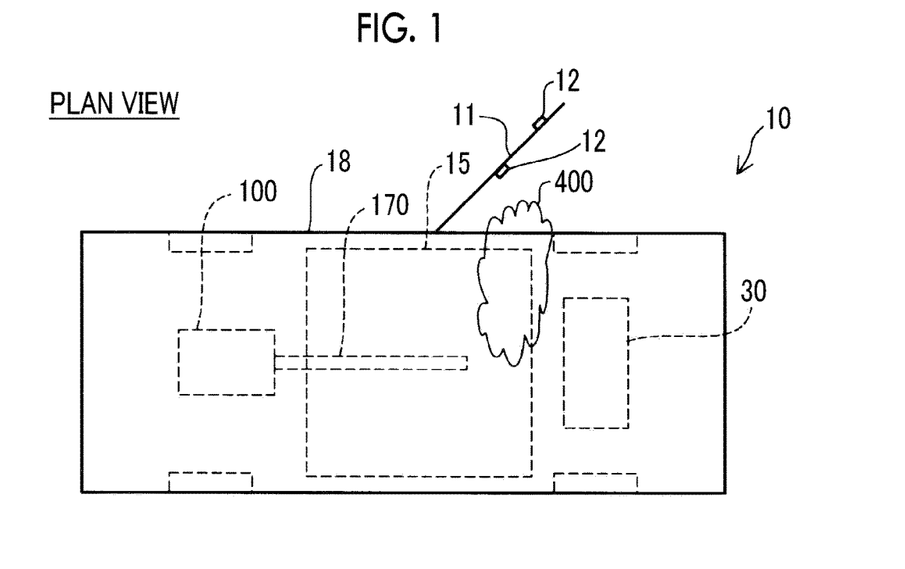
FIG. 1 is an explanatory view showing a plan view of a vehicle as a moving body.
Figure 2:
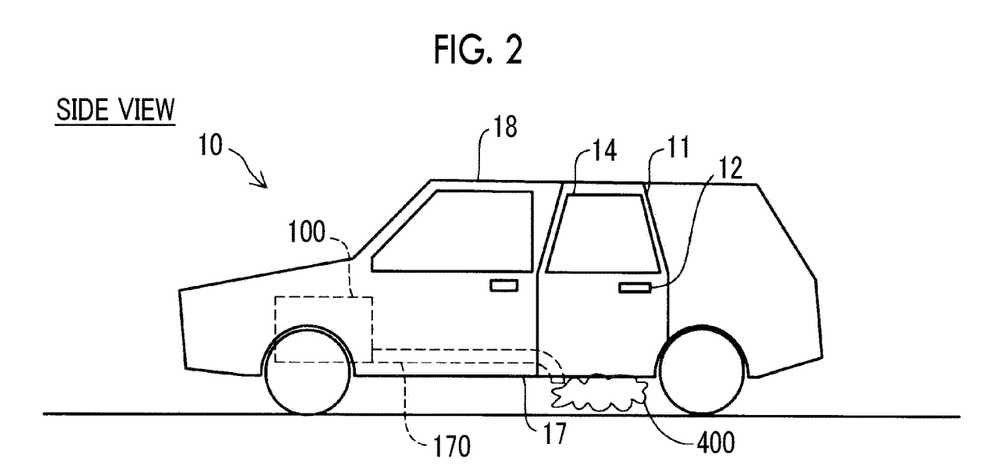
FIG. 2 is an explanatory view showing a side view of the vehicle.
Figure 3:
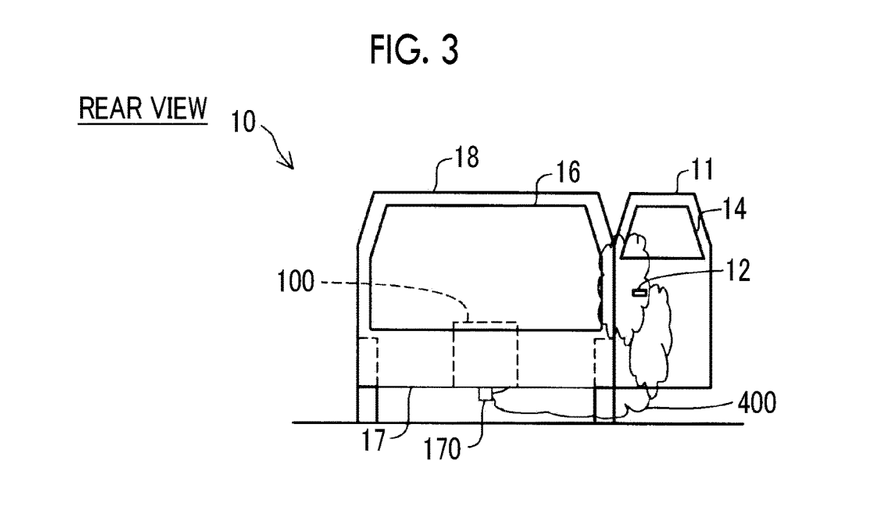
FIG. 3 is an explanatory view showing a rear view of the vehicle.

FIG. 1 is an explanatory view showing a plan view of a vehicle 10 as a moving body. FIG. 2 is an explanatory view showing a side view of the vehicle 10. FIG. 3 is an explanatory view showing a rear view of the vehicle 10. The vehicle 10 includes a door 11, a door knob 12, a window 14, a cabin 15, a hatch 16, a floor 17, a vehicle body 18, a secondary battery 30, a fuel cell 100, and an off-gas passage 170. The vehicle body 18 is the body of the vehicle 10, and the door 11 and the window 14 are provided in the vehicle body 18. The vehicle 10 may not include the hatch 16. In a case where the vehicle 10 does not include the hatch 16, the door 11 includes a door of the hatch 16. The vehicle 10 is a fuel cell vehicle on which the fuel cell 100 is mounted, and an occupant can ride in the cabin 15. The off-gas passage 170 through which an off-gas discharged from the fuel cell 100 is discharged to the atmosphere is provided under the floor 17 of the vehicle 10. An outlet of the off-gas passage 170 is provided substantially at the center of the vehicle 10 in the plan view. The fuel cell 100 causes an anode gas and a cathode gas to react with each other to obtain electric power. When hydrogen is used as the anode gas and the air is used as the cathode gas (oxygen in the air), hydrogen and oxygen react with each other to produce water, and the water is discharged as water vapor from the off-gas passage 170 to the atmosphere. In this case, when the atmospheric temperature (hereinafter, referred to as "outside air temperature") is low, the water vapor condenses and forms a mist 400. When the door 11 or the window 14 is open, the mist 400 may intrude into the cabin 15 of the vehicle 10 depending on the direction of the wind, and there is a possibility that the occupant may feel uncomfortable. As described above, the door 11 and the window 14 correspond to an opening and closing body provided between the cabin and the outside of the moving body (the vehicle 10). Although the connection relationship is not shown, the secondary battery 30 together with the fuel cell 100 becomes a power source of the vehicle 10.

Figure 4:
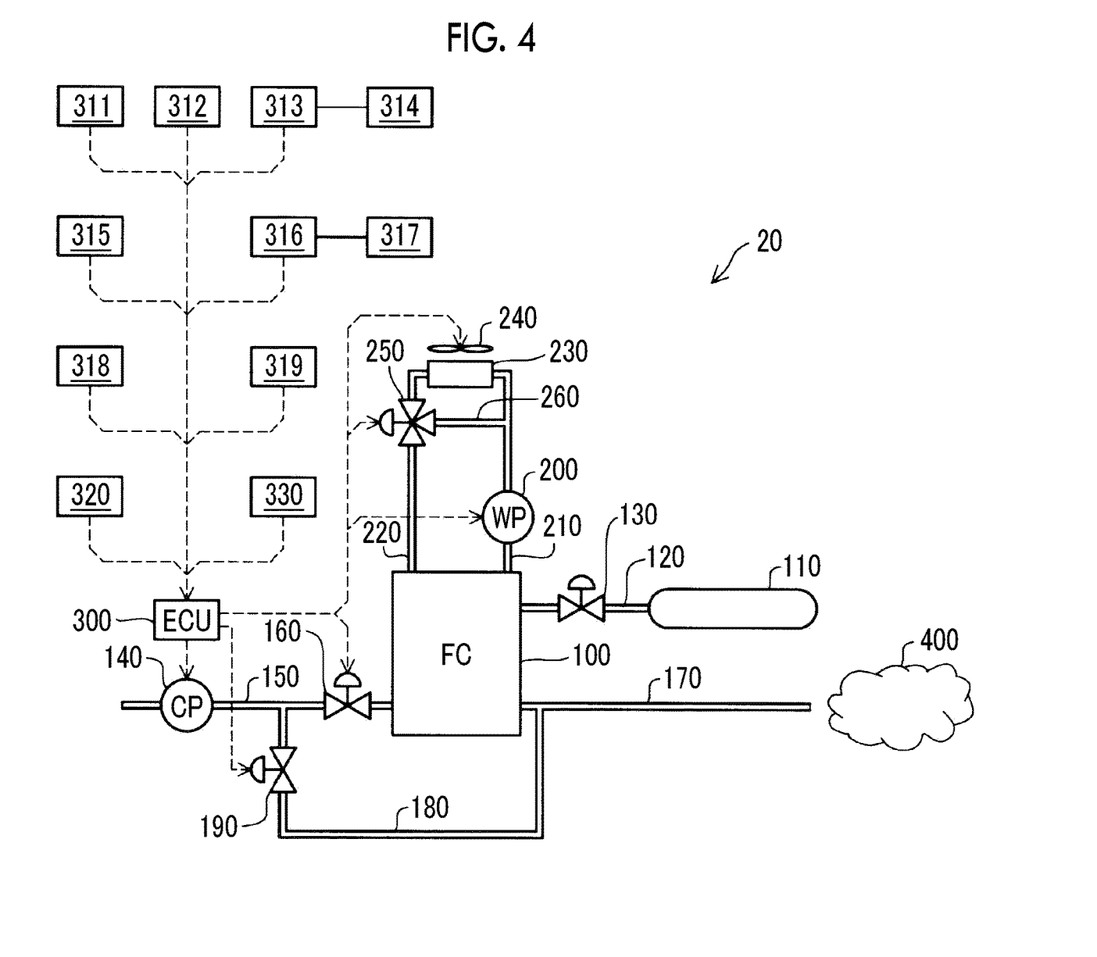
FIG. 4 is an explanatory view showing a schematic configuration of a fuel cell system mounted on the vehicle.

FIG. 4 is an explanatory view showing a schematic configuration of a fuel cell system 20 mounted on the vehicle 10 and various sensors provided in the vehicle 10. The fuel cell system 20 includes the fuel cell 100, a fuel tank 110, an anode gas supply passage 120, an anode gas supply portion 130, an air compressor 140, a cathode gas supply passage 150, a fuel cell inlet valve 160, the off-gas passage 170, a bypass passage 180, a bypass valve 190, a coolant pump 200, a coolant supply passage 210, a coolant discharge passage 220, a radiator 230, a radiator fan 240, a three-way valve 250, a coolant bypass passage 260, and a controller 300. The vehicle 10 includes, as the various sensors, an outside air temperature sensor 320, a speed sensor 330, a door opening and closing sensor 311, a door knob sensor 312, a door lock sensor 313, a door locking mechanism 314, a window opening and closing sensor 315, a window opening and closing operation portion 316, a window opening and closing operation portion contact sensor 317, a human detection sensor 318, and a camera 319. Not all the sensors described above may be provided. Sensors needed to determine an opening and closing situation of an opening and closing body, which will be described later, may be provided. For example, in a case where the opening and closing situation of the door 11 is to be determined, the door opening and closing sensor 311 or the door knob sensor 312 may be provided, and in a case where the opening and closing situation of the window 14 is to be determined, the window opening and closing sensor 315 and the window opening and closing operation portion contact sensor 317 may be provided.

As described above, the fuel cell 100 causes the anode gas and the cathode gas to react with each other to generate electric power. The fuel tank 110 stores the anode gas to be supplied to the fuel cell 100 and supplies the anode gas to the fuel cell 100. For example, hydrogen can be used as the anode gas. The anode gas supply passage 120 connects the fuel tank 110 to the fuel cell 100. The anode gas supply portion 130 is provided in the anode gas supply passage 120 to be supplied with the anode gas from the fuel tank 110 and supply the anode gas needed for an electric power demanded by the fuel cell 100 to the fuel cell 100. In order to efficiently use the anode gas, a fuel off-gas is recirculated to the anode gas supply passage 120 and is reused. A circuit of the recirculation system is not shown and a detailed description thereof will be omitted.

The air compressor 140 draws the air from the atmosphere and supplies the air to the fuel cell 100 as the cathode gas. The cathode gas supply passage 150 connects the air compressor 140 to the fuel cell 100. The fuel cell inlet valve 160 is provided between the air compressor 140 and the fuel cell 100. The fuel cell inlet valve 160 turns on and off the supply of the cathode gas to the fuel cell 100 by the controller 300, and in a case of turning on the supply, the opening degree of the fuel cell inlet valve 160 is adjusted. The off-gas passage 170 discharges an oxidant off-gas from the fuel cell 100 to the atmosphere. In this embodiment, the off-gas contains the water produced by the reaction between the hydrogen as the anode gas and the air (strictly speaking, oxygen in the air) as the cathode gas, as water vapor.

The bypass passage 180 connects the off-gas passage 170 to a point between the air compressor 140 of the cathode gas supply passage 150 and the fuel cell inlet valve 160. The air flowing through the bypass passage 180 is discharged to the atmosphere without being supplied to the fuel cell 100. The bypass valve 190 is provided in the bypass passage 180, and switches whether or not to flow the air to the bypass passage 180, and adjusts the flow rate of the air flowing through the fuel cell 100 and the bypass passage 180.

The coolant pump 200, the coolant supply passage 210, the coolant discharge passage 220, the radiator 230, the radiator fan 240, the three-way valve 250, and the coolant bypass passage 260 constitute a cooling circuit. The coolant pump 200 supplies a coolant to the fuel cell 100. The coolant supply passage 210 connects the coolant pump 200 to the fuel cell 100. The coolant discharge passage 220 sends the coolant discharged from the fuel cell 100 to the radiator 230. The radiator 230 cools the coolant of which the temperature has been increased by heat exchange with the fuel cell 100. The coolant of which the temperature has been decreased by the radiator 230 is sent to the coolant pump 200 and is supplied to the fuel cell 100. The radiator fan 240 sends a wind to the radiator 230. As a result, cooling of the coolant by the radiator 230 is promoted. The coolant bypass passage 260 sends the coolant in the coolant discharge passage 220 to the coolant supply passage 210 without passing the coolant through the radiator 230. The three-way valve 250 separates the coolant flowing to the radiator 230 and the coolant flowing to the coolant bypass passage 260 from each other.

The controller 300 controls the fuel cell system 20. The outside air temperature sensor 320 acquires the outside air temperature. The outside air temperature sensor 320 is disposed upstream of the air compressor 140 and may acquire, as the atmospheric temperature, the temperature of the air before being drawn by the air compressor 140. The speed sensor 330 acquires the speed of the vehicle 10.

The door opening and closing sensor 311 detects whether the door 11 is open or closed, that is, the opening and closing situation of the door 11. The door opening and closing sensor 311 may be a sensor that detects at least one of opening and closing of the door 11. The door knob sensor 312 is provided on the door knob 12 and detects whether or not a human hand touches the door knob 12 or whether or not a human hand approaches the door knob 12 within a predetermined distance from the door knob 12. The door lock sensor 313 detects whether or not the door 11 is locked by the door locking mechanism 314. The door locking mechanism 314 locks the door 11. The door locking mechanism 314 may have a door locking and unlocking switch. The door locking mechanism 314 locks the door 11 or unlocks the door 11 by detecting a manner in which a hand touches the door knob 12 and a manner in which a hand approaches using the door knob sensor 312.

The window opening and closing sensor 315 detects whether or not the window 14 is open. The window opening and closing sensor 315 may be a sensor that detects at least one of opening and closing of the window 14. The window opening and closing operation portion contact sensor 317 is provided in the window opening and closing operation portion 316 for opening and closing the window 14, and detects whether or not a human hand touches the window opening and closing operation portion 316.

The human detection sensor 318 detects a human around the vehicle 10. As the human detection sensor 318, for example, an infrared sensor can be used. The camera 319 photographs the surroundings of the vehicle 10, and in particular, photographs a human. The human detection sensor 318 and the camera 319 correspond to a sensor that recognizes a situation in which the possibility that the opening and closing body may be opened increases to a predetermined value (probability) or higher based on the location of a human outside the cabin 15. That is, the human detection sensor 318 or the camera 319 detects the location of a human outside the cabin 15, and in a case of detecting that an outside human approaches the door 11 of the vehicle 10, can determine that the possibility that the door 11 or the window 14 as the opening and closing body may be opened increases to a predetermined probability or higher.

Figure 5:
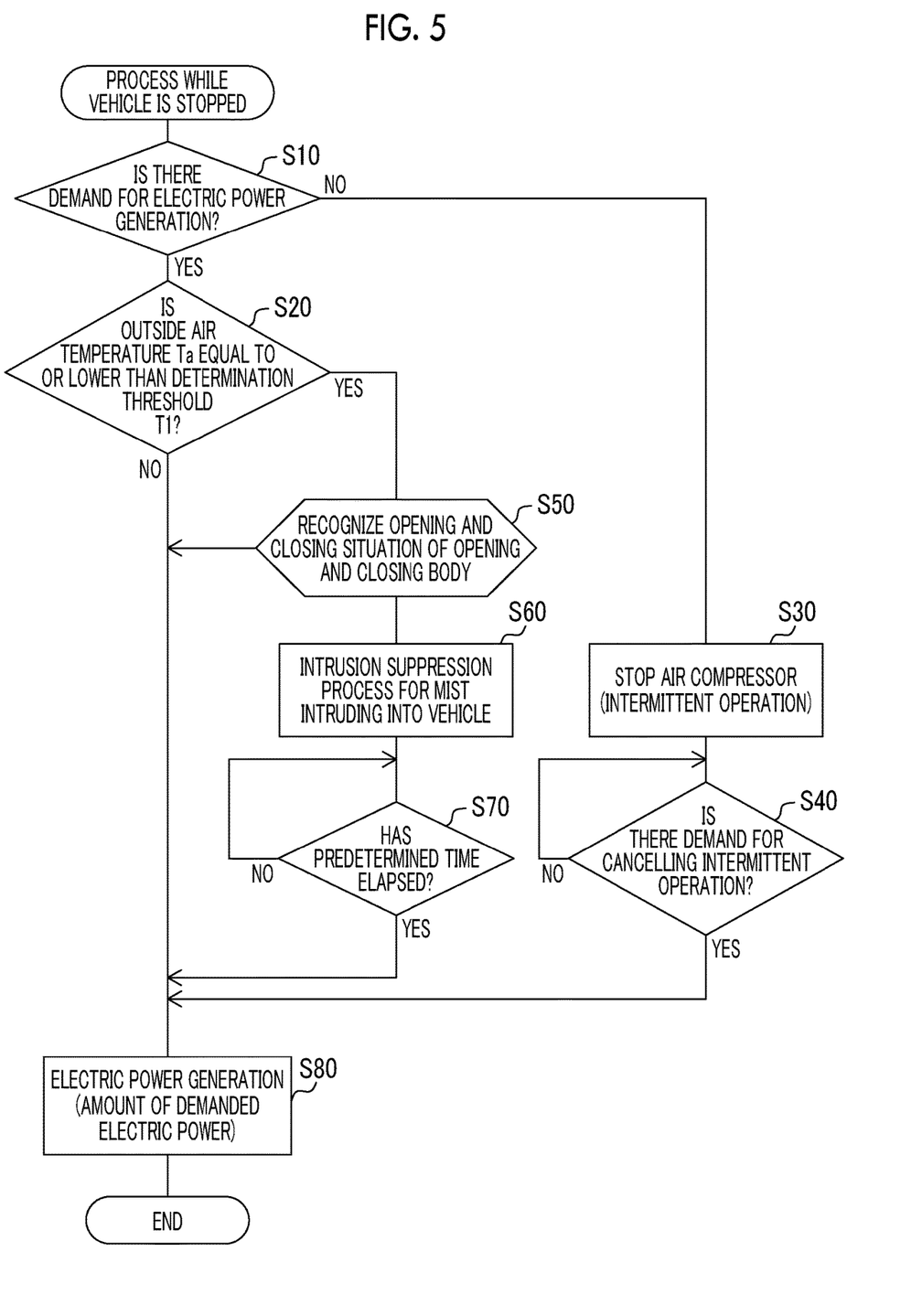
FIG. 5 is a control flowchart executed by a controller after the vehicle is stopped.

FIG. 5 is a control flowchart executed by the controller 300. The control flow is repeatedly executed after the vehicle 10 is stopped. The controller 300 functions as a stopped state detection portion and determines a stopped state of the vehicle 10, that is, whether or not the vehicle 10 is stopped, from the speed of the vehicle 10 obtained from the speed sensor 330. The controller 300 may determine the stopped state of the vehicle using information other than the speed of the vehicle 10 obtained from the speed sensor 330. For example, the controller 300 may recognize that the vehicle 10 is in a stopped state in a case where a shift lever (not shown) is in a P range as a shift position, or may also recognize that the vehicle 10 is in a stopped state in a case where a parking brake (not shown) is applied. The stopped state of the vehicle 10 may be determined in the combination described above. In step S10, the controller 300 determines whether or not there is a demand for electric power generation by the fuel cell 100. For example, in a case where the amount of electric power charging the secondary battery 30 is small, there is a demand for electric power generation by the fuel cell 100. In a case where there is a demand for electric power generation by the fuel cell 100, the process proceeds to step S20, and in a case where there is no demand for electric power generation by the fuel cell 100, the process proceeds to step S30.

A case where there is no demand for electric power generation by the fuel cell 100 will be described. In step S30, the controller 300 stops the air compressor 140. Stopping the air compressor 140 is called an "intermittent operation". Accordingly, the fuel cell 100 can generate electric power using residual air that has already been supplied to the fuel cell 100, but stops electric power generation when there is no residual air. In step S40, the controller 300 determines whether or not there is a demand for cancelling the intermittent operation. For example, in a case where there is a demand for electric power generation or when a predetermined time has elapsed after the start of the intermittent operation, the controller 300 determines that there is a demand for cancelling the intermittent operation, and the process proceeds to step S80. For example, in a case where the amount of electric power of the secondary battery 30 becomes lower than a threshold during the intermittent operation, a demand for electric power generation by the fuel cell 100 is made.

In step S20, the controller 300 determines whether or not an outside air temperature Ta is equal to or lower than a determination threshold T1. In a case where the outside air temperature Ta is equal to or lower than the determination threshold T1, there is a possibility that a mist may be formed from the water vapor contained in the off-gas discharged from the off-gas passage 170, so that the process proceeds to step S50. On the other hand, in a case where the outside air temperature Ta exceeds the determination threshold T1, there is little possibility that a mist may be formed from the water vapor contained in the off-gas, so that the process proceeds to step S80. Determination in step S20 may not be performed. In this case, in a case where there is a demand for electric power generation in step S10, the controller 300 allows the process to proceed to step S50.

In step S50, the controller 300 recognizes the opening and closing situation of the opening and closing body (the door 11 and the window 14). In a case where the opening and closing body is open, there is a possibility that the water vapor contained in the off-gas may intrude into the cabin 15 as a mist. While the water vapor diffuses as the mist, when the opening and closing body transitions from a closed state to an open state, there is a possibility that the mist may intrude into the cabin 15. Therefore, the controller 300 recognizes the opening and closing situation of the opening and closing body as an opening and closing situation recognition portion, and is not limited to a case where the opening and closing body is open. Even in a state in which the opening and closing body is closed, in a case where there is a possibility that the opening and closing body may be opened, the controller 300 allows the process to proceed to step S60, and proceed to step S80 in other cases.

Figure 6:
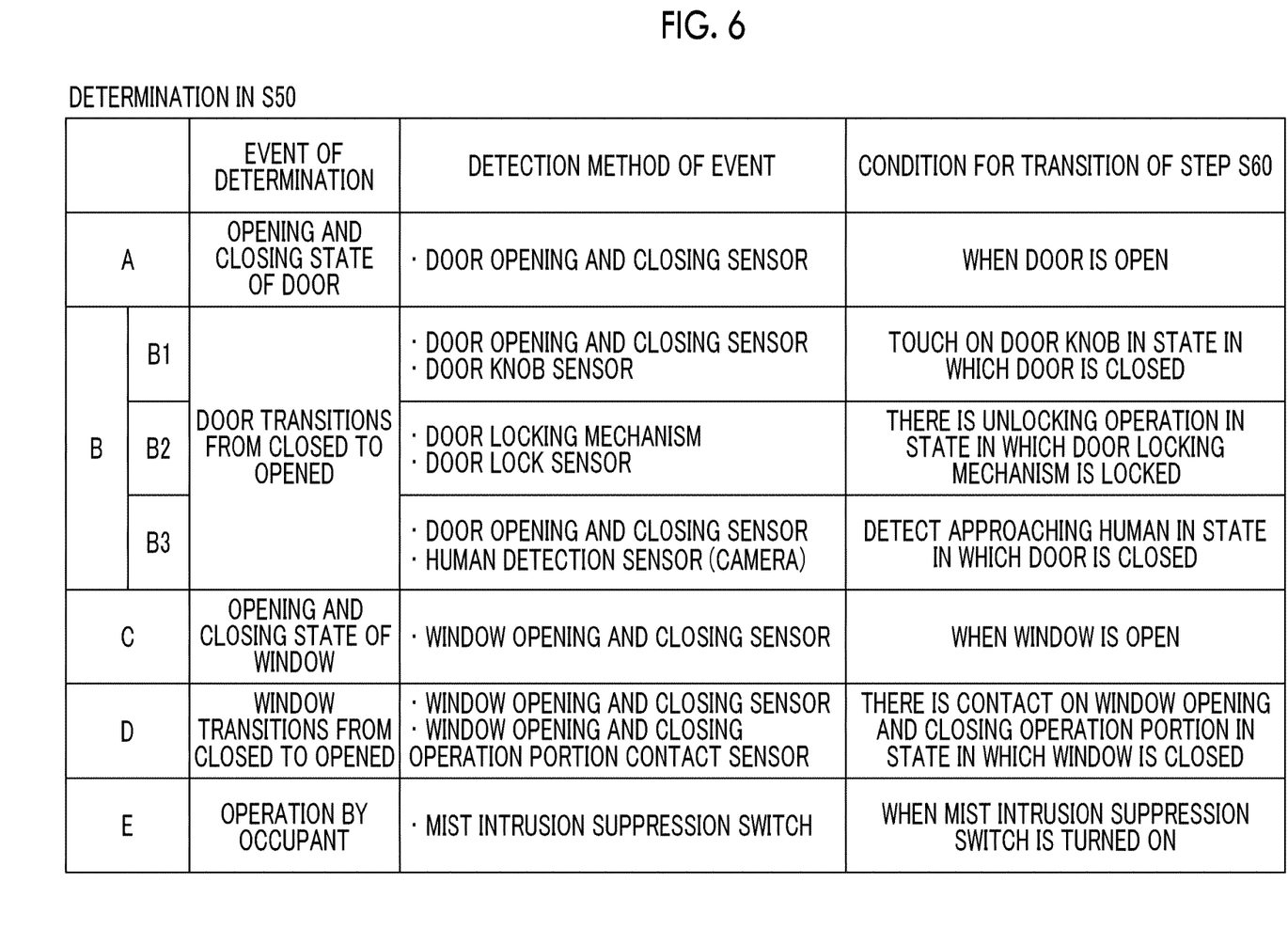
FIG. 6 is a table showing an example of events of determination in step S50 in FIG. 5, detection methods of the events, and conditions for transition to step S60.

FIG. 6 is a table showing an example of events of determination in step S50 in FIG. 5, detection methods of the events, and conditions for transition to step S60. In step S50, at least one event among the events is detected. As a matter of course, such transition conditions and detection methods may be combined.

(A) Opening and Closing Situation of Door 11

The controller 300 determines whether the door 11 is open or closed using the door opening and closing sensor 311, and in a case where the door 11 is open, allows the process to proceed to step S60. In a case where the door 11 is closed, the controller 300 further determines the following possibility (B).

(B) Possibility That Door 11 May Transition from Closed State to Open State

The controller 300 determines whether or not there is a possibility that the door 11 may transition from the closed state to the open state. As a determination method, for example, the following detection methods (B1) to (B3) may be exemplified.

(B1) Touch on Door Knob Sensor

In a case where the controller 300 determines that the door 11 is closed by a signal from the door opening and closing sensor 311, there is a case where a touch to the door knob sensor 312 is detected. In this case, there is a possibility that the door 11 may be opened, so that the controller 300 allows the process to proceed to step S60.

(B2) Unlocking of Door 11

In a case where the controller 300 determines that the door 11 is locked by the door locking mechanism 314 by a signal from the door lock sensor 313, there is a case where the controller 300 detects that the door locking mechanism 314 transitions from a locked state to an unlocked state. Even in this case, there is a possibility that the door 11 may be opened, so that the controller 300 allows the process to proceed to step S60.

(B3) Detection of Location of Human

The controller 300 recognizes a situation in which the possibility that the opening and closing body may be opened increases to a predetermined value or higher based on the location of a human outside the cabin 15. For example, there is a case where, in a case where the door 11 is closed, the human detection sensor 318 or the camera 319 detects a human approaching the vehicle 10 within a predetermined distance from the vehicle 10. In this case, there is a possibility that the approaching human may open the door 11, so that the controller 300 allows the process to proceed to step S60. In a case where the vehicle 10 does not include any of the human detection sensor 318 and the camera 319, the detection method (B3) is not executed.

(C) Opening and Closing Situation of Window 14

The controller 300 determines whether the window 14 is open or closed using the window opening and closing sensor 315, and in a case where the window 14 is open, allows the process to proceed to step S60. In a case where the window 14 is closed, the controller 300 further determines the following possibility (D).

(D) Possibility That Window 14 May Transition from Closed State to Open State The controller 300 determines whether or not there is a possibility that the window 14 may transition from a closed state to an open state. For example, in a case where the controller 300 determines that the window 14 is closed by a signal from the window opening and closing sensor 315, in a case where a human hand touches the window opening and closing operation portion contact sensor 317 provided in the window opening and closing operation portion 316, there is a possibility that the window 14 may be opened by operating the window opening and closing operation portion 316. Therefore, the controller 300 allows the process to proceed to step S60.

(E) Operation by Occupant

When there is an operation by the occupant, for example, when a mist intrusion suppression switch (not shown) is turned on, there is a possibility that the door 11 or the window 14 may be opened, so that the controller 300 allows the process to proceed to step S60.

In step S60 of FIG. 5, the controller 300 executes an intrusion suppression process for a mist intruding into the vehicle, for example, the cabin 15. The controller 300 executes at least one of the following processes as the intrusion suppression process for a mist intruding into the vehicle. As a matter of course, two or more of the processes may be combined to be executed.

Figure 7:
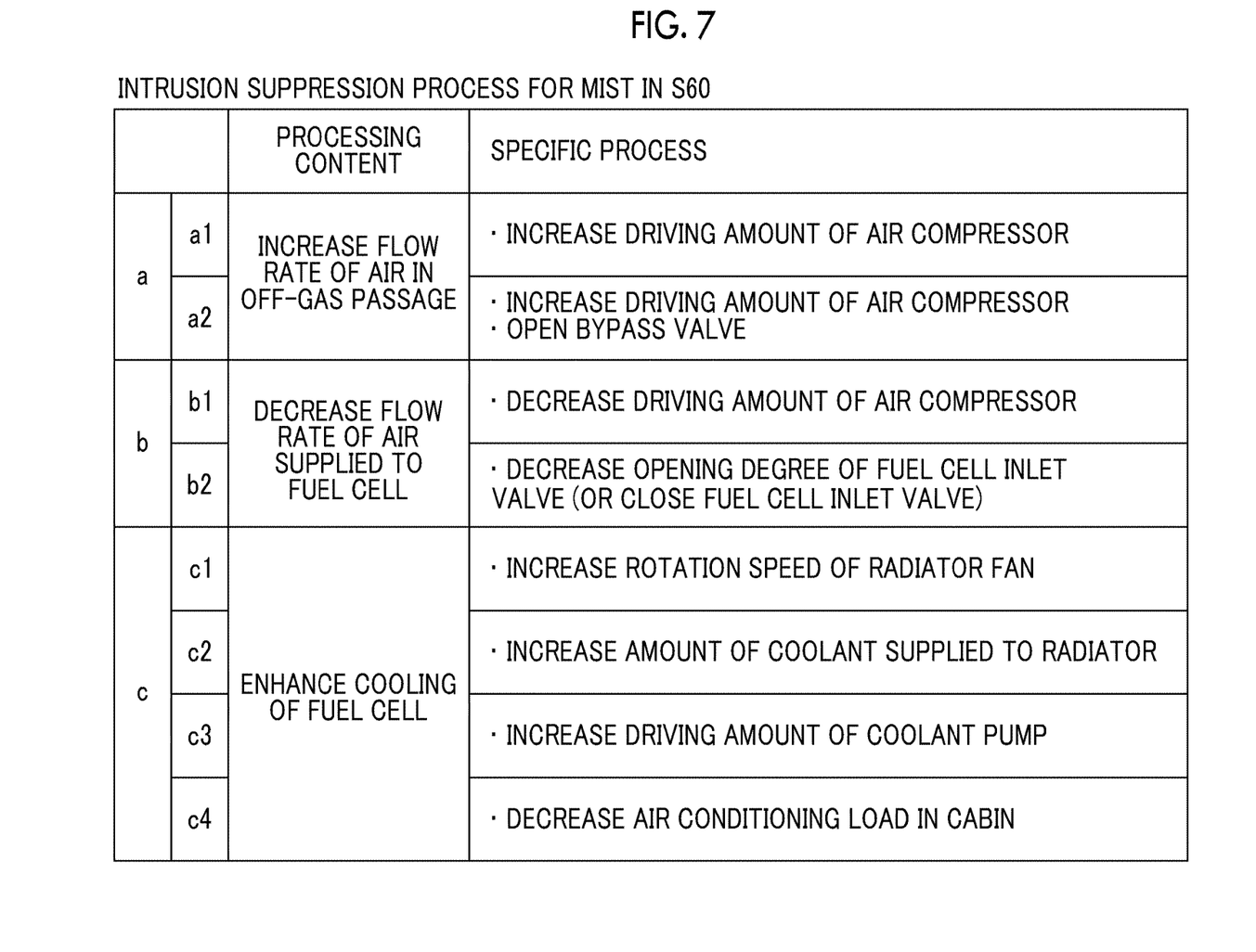
FIG. 7 is a table showing an intrusion suppression process for a mist intruding into the vehicle in step S60.

FIG. 7 is a table showing the intrusion suppression process for a mist intruding into the vehicle in step S60.

(a) Increase in Flow Rate of Air Flowing through Off-Gas Passage

The flow rate of the air flowing through the off-gas passage is increased as compared to that before the execution of the intrusion suppression process.

In a case where the intrusion suppression process (a) is adopted, the following method is possible.

(a1) The controller 300 increases a driving amount of the air compressor 140 from a driving amount needed for supplying a needed amount of the cathode gas for the demand for electric power generation. Accordingly, the water vapor can be blown off from the vicinity of the vehicle 10, so that a mist caused by the water vapor is not allowed to intrude into the cabin 15. The amount of water produced by electric power generation by the fuel cell 100 is determined by the amount of electric power generated, and the amount of electric power generated depends on the amount of current drawn from the fuel cell 100. Therefore, even in a case where an excessive amount of the cathode gas is supplied to the fuel cell 100, when the current drawn from the fuel cell 100 is small, the amount of electric power generated by the fuel cell 100 is small, and the amount of produced water is small. Therefore, even when the flow rate of the cathode gas is high, it is difficult for a large amount of water to be discharged from the fuel cell 100.

(a2) In a case where the process (a1) is executed, the bypass valve 190 is opened. By opening the bypass valve 190, the cathode gas produced due to an increase in the driving amount of the air compressor 140 is caused to flow into the bypass passage 180. In the manner described above, the cathode gas is not excessively supplied to the fuel cell 100. Therefore, the water is not excessively discharged from the fuel cell 100, and drying of the fuel cell 100 can be further suppressed.

In a case of executing the process (a1) or the process (a2), for example, the driving amount of the air compressor 140 may be set to 1.5 times the driving amount needed to supply a needed amount of the cathode gas for the demand for electric power generation.

(b) Reduction in Air Flow Rate Supplied to Fuel Cell

The flow rate of the air supplied to the fuel cell 100 is decreased to be lower than the flow rate of the air corresponding to the demanded amount of electric power generated. This decreases the amount of the water produced by the electric power generation and the amount of the off-gas discharged from the fuel cell 100. The amount of the water vapor discharged from the off-gas passage 170 to the atmosphere can be decreased.

In a case where the intrusion suppression process (b) is adopted, the following method is conceivable.

(b1) The driving amount of the air compressor 140 is decreased to be lower than the driving amount needed to supply a needed amount of the cathode gas for the demand for electric power generation. For example, the driving amount of the air compressor 140 may be decreased to be equal to or lower than ½ of the driving amount needed to supply a needed amount of the cathode gas for the demand for electric power generation. The air compressor 140 may also be stopped.

(b2) The fuel cell inlet valve 160 is decreased in opening degree or the fuel cell inlet valve 160 is closed. In this case, the bypass valve 190 may be opened to allow the cathode gas to flow into the bypass passage 180.

(c) Enhancing Cooling of Fuel Cell

Cooling of the fuel cell 100 is enhanced as compared to that before the intrusion suppression process is executed. The lower the temperature of a gas, the lower the amount of saturated water vapor. By enhancing the cooling of the fuel cell 100, the temperature of the fuel cell 100 is decreased such that the temperature of the discharged off-gas is also decreased. Accordingly, the absolute humidity of the off-gas, that is, the amount of water vapor contained in the off-gas can be decreased, so that the amount of water vapor discharged to the atmosphere can be decreased.

In a case where the intrusion suppression process (c) is adopted, the following method is conceivable.

(c1) The rotation speed of the radiator fan 240 is increased as compared that before the execution of the intrusion suppression process. This decreases the temperature of the coolant, decreases the temperature of the fuel cell 100, and thus decreases the temperature of the off-gas discharged from the fuel cell 100.

(c2) By operating the three-way valve 250, the amount of the coolant supplied to the radiator 230 is increased as compared that before the execution of the intrusion suppression process. This increases the amount of the coolant cooled by the radiator 230 and thus decreases the temperature of the coolant, so that the temperature of the fuel cell 100 can be decreased, and the temperature of the off-gas discharged from the fuel cell 100 can be decreased.

(c3) A driving amount of the coolant pump 200 is increased as compared that before the execution of the intrusion suppression process. This increases the amount of the coolant supplied to the fuel cell 100, and thus decreases the temperature of the fuel cell 100, so that the temperature of the off-gas discharged from the fuel cell 100 can be decreased.

(c4) In a case where a heat exchanger for cabin air conditioning is disposed in front of the radiator 230, an air conditioning load in the cabin is decreased. This decreases the amount of heat exchanged by the heat exchanger for cabin air conditioning, so that cooler air (outside air) is supplied to the radiator 230. Therefore, the temperature of the coolant can be decreased, the temperature of the fuel cell 100 can be decreased, and the temperature of the off-gas discharged from the fuel cell 100 can be decreased.

In step S70, the controller 300 determines whether or not a predetermined time has elapsed after the execution of the intrusion suppression process, and in a case where the predetermined time has elapsed, allows the process to proceed to step S80.

In step S80, the controller 300 sets the driving amount of the air compressor 140 to the driving amount needed to supply a needed amount of the cathode gas for the demand for electric power generation, and returns operations of the coolant pump 200, the radiator fan 240, and the three-way valve 250 to operation states before the execution of the intrusion suppression process.

As described above, according to the embodiment, while the vehicle 10 (moving body) is stopped, when there is a demand for electric power generation by the fuel cell 100 and the opening and closing body sensor (the door opening and closing sensor 311 or the window opening and closing sensor 315) detects that the opening and closing body (the door 11 or the window 14) is open, the controller 300 executes the intrusion suppression process to make it difficult for the water vapor discharged from the off-gas passage 170 to enter the cabin 15 as a mist. Therefore, it is difficult for the mist to enter the cabin 15, and an uncomfortable feeling of the occupant can be suppressed.

According to the embodiment, the controller 300 executes the intrusion suppression process in a case where the outside air temperature is equal to or lower than the determination temperature, so that intrusion of the water vapor into the cabin 15 as a mist can be further suppressed. The controller 300 may execute the intrusion suppression process even when the outside air temperature exceeds the determination temperature. It is difficult for the water vapor that is not in the form of a mist to enter the cabin 15, and an uncomfortable feeling of the occupant can be further suppressed.

According to the embodiment, even in a case where a transition of the opening and closing body (the door 11 or the window 14) from the closed state to the open state is detected as well as in the case where the opening and closing body (the door 11 or the window 14) is open, the controller 300 executes the intrusion suppression process to make it difficult for the water vapor to enter the cabin 15 as a mist. That is, since the intrusion suppression process is started before the opening and closing body (the door 11 or the window 14) transitions from the closed state to the open state, it is possible to make it difficult for the mist to intrude into the cabin 15. As a method of detecting the transition of the opening and closing body (the door 11 or the window 14) from the closed state to the open state, various sensors such as the door knob sensor 312, the door lock sensor 313, the window opening and closing operation portion contact sensor 317, the human detection sensor 318, and the camera 319 can be used.

The intrusion suppression process may be a process of blowing off the water vapor with a large amount of the cathode gas, and may be a process of decreasing the amount of the water vapor discharged from the off-gas passage 170.

Even in cases other than the case where the opening and closing body (the door 11 or the window 14) is open or the transition of the opening and closing body (the door 11 or the window 14) from the closed state to the open state is detected, the controller 300 may execute the intrusion suppression process. For example, in a case where a drain switch is provided in the vehicle 10 and the drain switch is pressed while the vehicle is stopped, the controller 300 may execute the intrusion suppression process regardless of the state of the opening and closing body (the door 11 or the window 14).

As a mist suppression process, a space under the floor 17 in the vicinity of the off-gas passage 170 of the vehicle 10 may be heated. Since the temperature under the floor 17 is increased, the amount of saturated water vapor is increased, and the relative humidity is decreased, so that it becomes difficult to form a mist.

In the embodiment, the control flow of FIG. 5 is repeatedly executed after the vehicle 10 is stopped. However, the stop in this case may include, in addition to a case where the vehicle is completely stopped, a case where the vehicle moves in a state at a speed of 5 km/h or less, for example. This is because, in a case of parking, for example, a parking position is adjusted while the door 11 or the window 14 is open in some cases.

In the embodiment, the vehicle 10 on which the fuel cell is mounted is exemplified. However, the disclosure can also be applied to a moving body other than the vehicle 10, for example, in addition to a passenger car on which a fuel cell is mounted, a bus, a truck, a dual mode vehicle, and a train.

The disclosure is not limited to the embodiment and other embodiments, and can be realized in various configurations without departing from the gist thereof. For example, technical features in the embodiment and the other embodiments corresponding to the technical features in each of the aspects described in "SUMMARY" can be appropriately replaced or combined in order to solve some or all of the above-mentioned problems, or to achieve some or all of the above-mentioned effects. The technical features can be appropriately deleted unless the technical features are described as indispensable in this specification.

What is claimed is:

1. A moving body having a fuel cell, the moving body comprising:
    an off-gas passage provided under a floor of the moving body and configured to discharge an off-gas that is discharged from the fuel cell and contains water vapor;
    a vehicle body having a cabin in which an occupant rides;
    an opening and closing body including at least one of a door and a window provided in the vehicle body;
    an opening and closing situation recognition portion configured to recognize an opening and closing situation of the opening and closing body;
    a stopped state detection portion configured to detect that the moving body moves at a predetermined speed or lower; and
    a controller configured to, in a case where the moving body moves at the predetermined speed or lower and there is a demand for electric power generation by the fuel cell, when the opening and closing situation recognition portion recognizes a situation in which the opening and closing body is in an open state, execute an intrusion suppression process;
    the off-gas passage is a cathode off-gas passage which discharges a cathode gas; and
    the controller executes, as the intrusion suppression process, at least process (a) or (b) among
    (a) a process of increasing a flow rate of air flowing into the cathode off-gas passage as compared that before execution of the intrusion suppression process, and
    (b) a process of decreasing the flow rate of the air supplied to the fuel cell to be lower than the flow rate of the air corresponding to a demanded amount of electric power generated.

2. The moving body according to claim 1, further comprising an outside air temperature sensor configured to acquire an outside air temperature,
    wherein the controller does not execute the intrusion suppression process in a case where the outside air temperature is equal to or higher than a predetermined temperature.

3. The moving body according to claim 1, wherein the opening and closing situation recognition portion includes at least one of (A) a first sensor configured to detect at least one of opening and closing of the opening and closing body, (B) a second sensor configured to detect an operation of a switch for opening the opening and closing body, (C) a third sensor configured to detect an operation of a switch for unlocking the opening and closing body, and (D) a fourth sensor configured to recognize that a possibility that the opening and closing body is opened is equal to or higher than a predetermined value based on location of a human outside the moving body.

* * * * *